Feb. 8, 1927.
J. L. WOODWARD
1,617,228
FERTILIZER DISTRIBUTOR
Filed Aug. 25, 1924   2 Sheets-Sheet 1
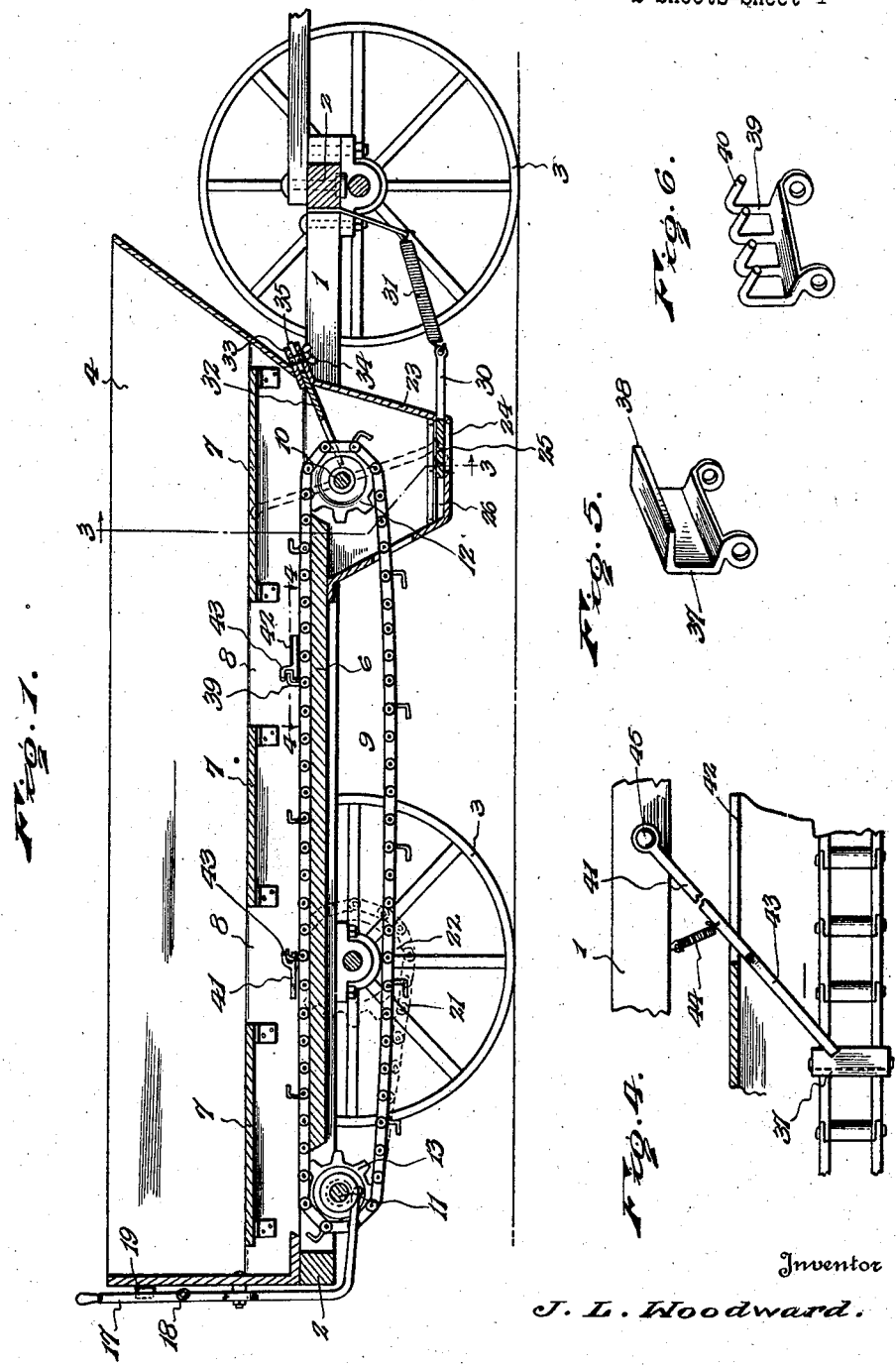
Inventor
J. L. Woodward.
By Lacy & Lacy, Attorneys

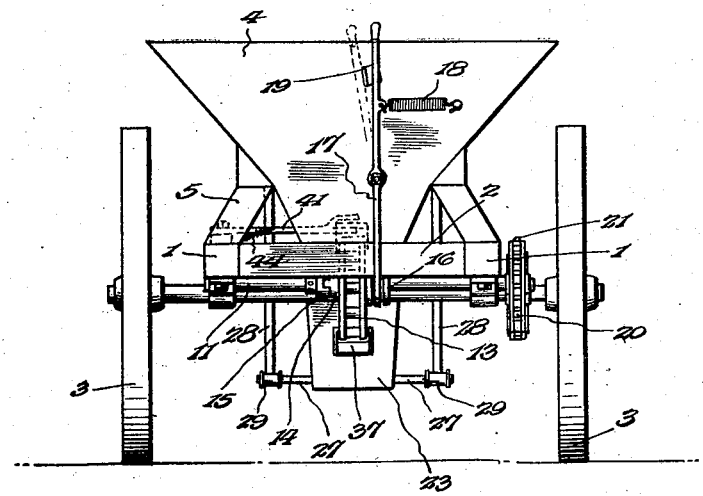
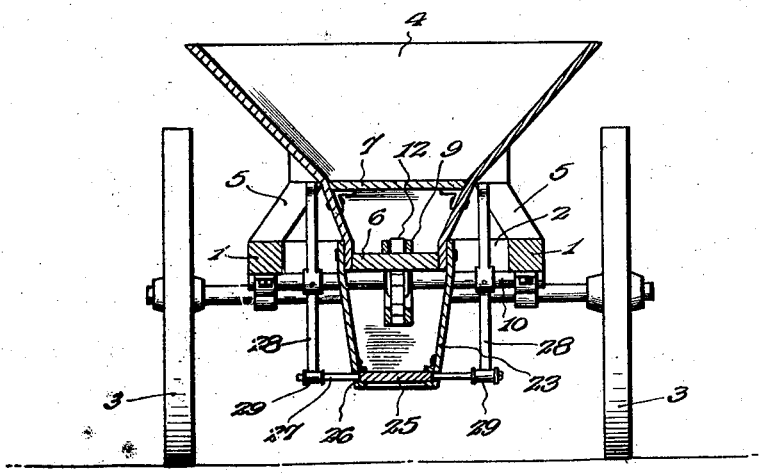
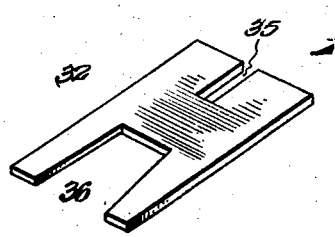

Patented Feb. 8, 1927.

UNITED STATES PATENT OFFICE.

JAMES L. WOODWARD, OF VIAN, OKLAHOMA.

FERTILIZER DISTRIBUTOR.

Application filed August 25, 1924. Serial No. 734,023.

This invention relates to fertilizer distributors and its primary object is to provide a machine of light draft and simple construction whereby barnyard fertilizer may be distributed on the rows which are to be cultivated and which may be easily adjusted to permit the fertilizer to be discharged in a continuous stream or at such intervals as may be deemed desirable. The invention seeks to minimize the handling of the fertilizer and also to provide simple means whereby any lumps will be broken up so that the material will be discharged in a finely comminuted condition which will facilitate its working into the soil. Other objects of the invention will appear incidentally in the course of the following description.

The invention is illustrated in the accompanying drawings, in which—

Figure 1 is a central longitudinal vertical section of a machine embodying my improvements;

Fig. 2 is a rear end elevation of the same;

Fig. 3 is a transverse section on the line 3—3 of Fig. 1;

Fig. 4 is an enlarged plan view of one of the pulverizers;

Figs. 5 and 6 are detail perspective views of feeding blades which are employed;

Fig. 7 is a detail perspective view of a cut-off valve which is provided at the discharge end of the machine.

In carrying out my invention, I employ a truck consisting of suitable sills or longitudinal beams 1 connected by end bars or cross beams 2 and mounted upon wheels 3 whereby it may be easily drawn over the field. The body 4 of the vehicle is of a general hopper-like form having downwardly converging sides which are supported by posts 5 from the truck and have their lower ends secured to a platform or bottom 6, the said bottom or platform terminating short of the ends of the hopper or body, as shown clearly in Fig. 1. Above the platform or bottom 6 are false bottoms or platforms 7 which are secured to and carried by the sides of the hopper in any convenient manner and are separated at intervals to provide open spaces 8 through which the material may pass to the distributor. When the body is loaded, these false bottoms, platforms or shelves will support the great weight of the material so that it will not bear directly upon and tend to clog the operation of the distributor or conveyer 9, as will be readily understood. As the distribution of the material proceeds, it may be necessary from time to time to employ a rake to remove the material from these shelves or inner platforms but such work may be very easily performed.

Supported in suitable bearings upon the under sides of the sills or longitudinal beams 1 are front and rear shafts 10 and 11 carrying sprocket wheels which engage in and drive the conveyer belt or chain 9. The forward sprocket wheel 12 is fixed upon the front shaft 10 but the rear sprocket wheel 13 is loosely mounted upon the rear shaft 11. Upon one side, this sprocket wheel 13 is constructed with a clutch hub 14 adapted to engage a clutch collar 15 secured upon the shaft, and at the opposite side of the sprocket is a hub extension 16 which is provided with an annular groove adapted to be engaged by the end of a lever 17 mounted upon the rear end wall of the body 4 whereby the clutch hub 14 may be moved into and out of engagement with the clutch collar 15. A spring 18 is attached to the vehicle body and to the lever so as to normally hold the parts in the position shown in Fig. 2 whereby the sprocket will be driven, but when the vehicle is being driven from the barn to the point of use the lever is set in the position indicated by dotted lines in Fig. 2 so that the sprocket will be free and no motion will be imparted thereto with the result that the fertilizer will not be distributed. To hold the lever in the dotted line position, a lug or bracket 19 is provided upon the rear end wall of the body 4 against which the lever will bear and be held by the spring 18 so that it will not set the parts to work until it has been shifted over and clear of the said lug or bracket, as will be readily understood. To operate the shaft 11, a driving sprocket 20 is secured thereon adjacent one end and a chain 21 is trained around the said sprocket and around a sprocket 22 secured upon the axle of the rear wheels 3 so that, as the vehicle is drawn forward, the shaft 11 will be rotated.

The distributing conveyer comprises an endless chain trained about the sprockets 12 and 13, as shown clearly in Fig. 1, the upper run of the chain or conveyer riding on the platform 6 while the lower return run thereof passes below said platform. As shown clearly in Fig. 1, the rear sprocket 13 operates in the space between the rear end of the platform 6 and the rear cross bar 2 of the truck, while the front sprocket is disposed within a discharge hopper or funnel 23 secured to the body and the truck and depending therefrom at the front end of the body. This discharging hopper or funnel is provided with an outlet opening 24 in its lower end adjacent its front side and a sliding cut-off 25 is supported by the bottom of the hopper in rear of the said outlet opening, the sides of the hopper being provided with horizontal slots 26 through which trunnions 27 on the sides of the cut-off extend to be engaged by tappets or radial arms 28 secured upon the front shaft 10 at the outer sides of the hopper, as shown clearly in Figs. 2 and 3. To minimize wear, friction rollers 29 may be mounted upon the trunnions 27 to receive the impact of the tappets, as will be readily understood. The cut-off is also provided with a central tongue 30 on its front edge which projects through the front wall of the hopper or funnel 23, and a spring 31 is attached to said tongue and to a fixed part of the truck so that the cut-off will be normally held at the front of the funnel to cover the outlet port 24, as shown in Fig. 1. In the front side of the hopper at the top of the same is provided an adjustable cut-off or valve 32 which is slidably mounted in ways 33 provided in the front wall of the body and adjustably held in said ways by a set screw 34 extending through a slot 35 in the valve, as will be understood and as shown in Fig. 1. The inner end of the valve 32 is forked, as shown at 36, whereby it may fit around the distributor chain 9 and may be set more or less closely thereto to regulate the flow of material through the funnel to the outlet port of the same. The discharge may thus be easily regulated so that the material may pass more or less rapidly to the outlet of the funnel and be delivered to the ground in the desired quantity. Obviously as the machine is drawn forward, the tappets 28 will strike against the trunnions 27 and move the cut-off 25 rearwardly to permit a discharge of the fertilizer and by varying the number of the tappets the discharge may be effected at any desired intervals, it being understood that as the tappets clear the trunnions the spring 31 will at once draw the cut-off forward to cut-off the flow until the tappets again engage the trunnions. By disconnecting the spring, the cut-off may be set at the rear of the funnel and the fertilizer then permitted to discharge in a continuous stream.

To insure positive feeding of the fertilizer forward to the funnel, feeding elements are fitted at intervals to the conveyer chain 9, and these elements may be in the form of an imperforate transverse web 37 having a forwardly projecting lip 38 at its upper edge, or may be in the form of a transverse row of fingers 39 having their terminals 40 projecting forwardly, as shown in Fig. 6. It will be understood that these feeding elements may be disposed at any desired intervals and they may be all in the form of the blades shown in Fig. 5 or all in the form of the fingers shown in Fig. 6 or the two forms may be used upon the same chain. Inasmuch as large lumps are frequently formed in the fertilizer and will be loaded into the body 4 with the same, I provide means for breaking up and pulverizing these lumps which are illustrated as breaker arms or levers 41 pivoted upon one of the side beams or sills 1 and extending horizontally through slots 42 in the sides of the body. The inner ends of these pulverizing or breaker arms are formed into forks 43 which project over the conveyer into the path of the feeder elements and are adapted to be engaged by the latter as they move forwardly with the chain 9. Springs 44 are disposed between and attached to the sill 1 and the respective breaker arms and tend to hold them constantly in their rearmost positions, shown in Fig. 4. As the feeding elements move forwardly with the chain, they will successively be brought against the inner forked end of the breaker arm and by engaging therewith will swing it forward about its pivot 45 until eventually the feeding element will clear the end of the fork, whereupon the spring 44 will at once draw the same rearwardly to its initial position causing it to move forcibly through the material. The parts will preferably be so timed that, as the breaker arm reaches the rearward limit of its movement, it will be engaged by a succeeding feeding element and obviously any lumps which may be caught between them will be completely broken up and pulverized. The rapid movement of the breaker arms under the influence of the retractile springs effects an agitation of the fertilizer whereby it is comminuted, and the overhanging terminals of the feeder elements prevent release of the breaker arms during their movement with the conveyor so that a full stroke of the breaker arms is assured.

From the foregoing description, taken in connection with the accompanying drawings, it will be seen that I have provided a very simple, compact and easily operating machine whereby fertilizer will be efficiently distributed in a row and may be deposited at hills or continuously as may be preferred.

Having thus described the invention, I claim:

1. A fertilizer distributor comprising a portable body, a discharge hopper depending from the body at the front end thereof and provided with an outlet in its lower end and with horizontal slots in its sides, a cut-off slidably mounted upon the bottom of the hopper and having trunnions extending through said slots, yieldable means for holding the cut-off over the outlet, a feeding chain extending longitudinally of the body to feed material forwardly to the hopper, a shaft extending through the upper portion of the hopper and supporting the said feeding chain, and radial tappets carried by the ends of the said shaft and adapted to impinge against the said trunnions whereby to move the cut-off from over the outlet.

2. A fertilizer distributor comprising a portable body having downwardly converging sides and a platform between the lower ends of the sides, a feeder chain arranged to travel forwardly over the platform, and shelves extending between the sides of the body above the said feeder chain and spaced apart longitudinally of the body In testimony whereof I affix my signature.

JAMES L. WOODWARD. [L. S.]